United States Patent
Bibbo et al.

(10) Patent No.: US 10,113,670 B2
(45) Date of Patent: Oct. 30, 2018

(54) SINGLE USE WALL PASS-THROUGH SYSTEM

(71) Applicant: NewAge Industries, Inc., Southampton, PA (US)

(72) Inventors: Kenneth Bibbo, Freehold, NJ (US); John Stover, Furlong, PA (US); Milton A. Butler, Liberty, MO (US)

(73) Assignee: NewAge Industries, Inc., Southampton, PA (US)

( * ) Notice: Subject to any disclaimer, the term of this patent is extended or adjusted under 35 U.S.C. 154(b) by 178 days.

(21) Appl. No.: 14/972,838

(22) Filed: Dec. 17, 2015

(65) Prior Publication Data

US 2016/0102785 A1 Apr. 14, 2016

Related U.S. Application Data

(63) Continuation-in-part of application No. 14/501,506, filed on Sep. 30, 2014, which is a continuation-in-part of application No. 13/853,392, filed on Mar. 29, 2013, now Pat. No. 8,870,230.

(60) Provisional application No. 61/617,941, filed on Mar. 30, 2012.

(51) Int. Cl.
  *F16L 5/02* (2006.01)
  *F16L 5/10* (2006.01)

(52) U.S. Cl.
  CPC .. *F16L 5/10* (2013.01); *F16L 5/02* (2013.01)

(58) Field of Classification Search
  CPC ............... F16L 5/00; F16L 5/02; F16L 23/06
  USPC .......... 285/139.1, 136.1, 409, 408, 407, 365
  See application file for complete search history.

(56) References Cited

U.S. PATENT DOCUMENTS

| | | |
|---|---|---|
| 1,062,015 A | 5/1913 | Lane |
| 1,989,614 A | 1/1935 | Halpern et al. |
| 2,198,535 A | 4/1940 | James |
| 2,413,308 A | 12/1946 | Arnold |
| 2,793,830 A | 5/1957 | Nakaji et al. |
| 2,882,071 A | 4/1959 | Klompar |
| 3,275,347 A | 9/1966 | Scott |
| 3,351,361 A | 11/1967 | Martin |
| 3,649,054 A | 3/1972 | McClenan |
| 4,071,265 A | 1/1978 | Wallace |
| 4,071,267 A | 1/1978 | David |
| 4,194,765 A | 3/1980 | Reddy |
| 4,252,348 A | 2/1981 | Kojima |
| 4,281,422 A | 8/1981 | Simonelli |
| 4,429,655 A | 2/1984 | Tang |
| 4,593,940 A | 6/1986 | Wilder |
| 4,828,296 A | 5/1989 | Medvick |
| 5,290,071 A | 3/1994 | Rider et al. |
| 5,345,813 A | 9/1994 | Flessas |

(Continued)

FOREIGN PATENT DOCUMENTS

EP  0117821  9/1984

*Primary Examiner* — David Bochna
(74) *Attorney, Agent, or Firm* — Volpe and Koenig, P.C.

(57) ABSTRACT

A single use wall pass-through system having a fixed wall part attached through an opening in a wall and connected by at least one mounting flange. The fixed wall part includes clamping flanges used to provide a sealed connection between the fixed wall part and the hose or tube which carries the material from an outside area into another area defined on the inside of the wall. A combination gasket and clamp plate formed as one piece connects to the clamping flange via a clamping ring. The transfer hose and the combination gasket and clamp plate are preferably disposable.

10 Claims, 14 Drawing Sheets

(56) References Cited

U.S. PATENT DOCUMENTS

| | | | |
|---|---|---|---|
| 5,505,499 | A | 4/1996 | Wallbank |
| 5,562,882 | A | 10/1996 | Smith et al. |
| 5,722,699 | A | 3/1998 | Brancher |
| 5,803,513 | A | 9/1998 | Richardson |
| 5,921,589 | A | 7/1999 | Dubois |
| 5,967,567 | A | 10/1999 | Nordstrom |
| 5,971,444 | A | 10/1999 | Hawkins |
| 6,161,589 | A | 12/2000 | Bolotte et al. |
| 6,183,021 | B1 | 2/2001 | Walsh et al. |
| 6,883,836 | B2 | 4/2005 | Breay et al. |
| 7,237,806 | B2 | 7/2007 | Krowech et al. |
| 7,284,731 | B1 | 10/2007 | Johnson et al. |
| 7,712,789 | B2 | 5/2010 | Heuer et al. |
| 7,758,084 | B2 | 7/2010 | Boudry et al. |
| 8,328,245 | B2 | 12/2012 | Gayer et al. |
| 2004/0094951 | A1 | 5/2004 | Sigrist et al. |
| 2006/0001261 | A1 | 1/2006 | Miyajima et al. |
| 2008/0084032 | A1 | 4/2008 | Cravens |
| 2015/0014943 | A1 | 1/2015 | Vasinis |
| 2016/0164270 | A1 | 6/2016 | Sims et al. |

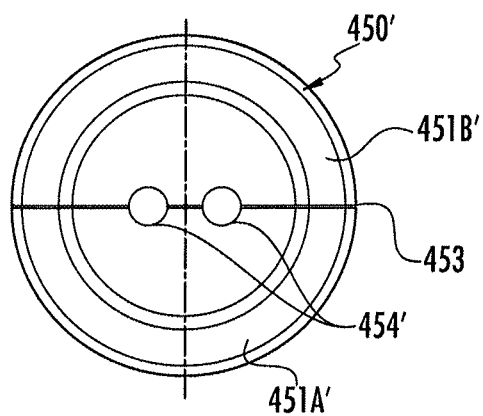
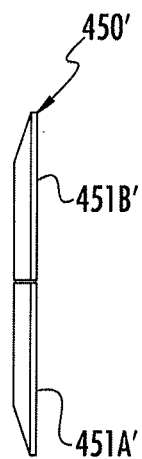
FIG. 35    FIG. 36
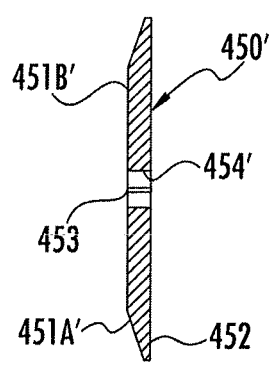
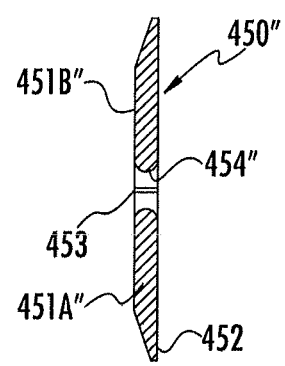
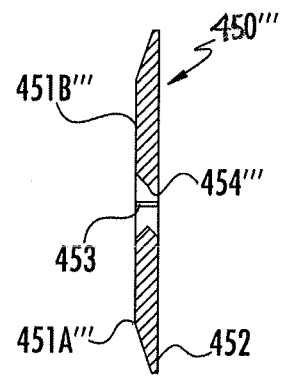
FIG. 37    FIG. 38    FIG. 39

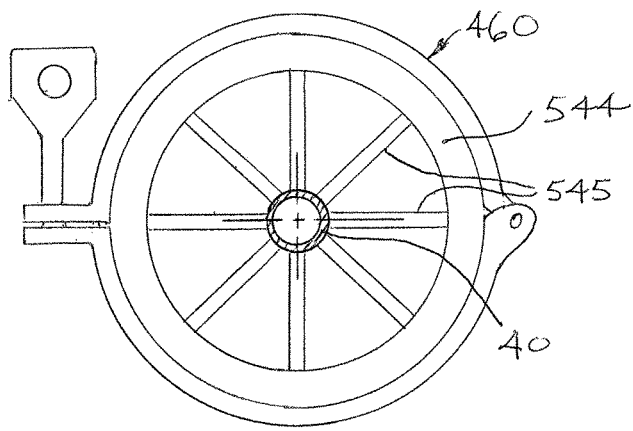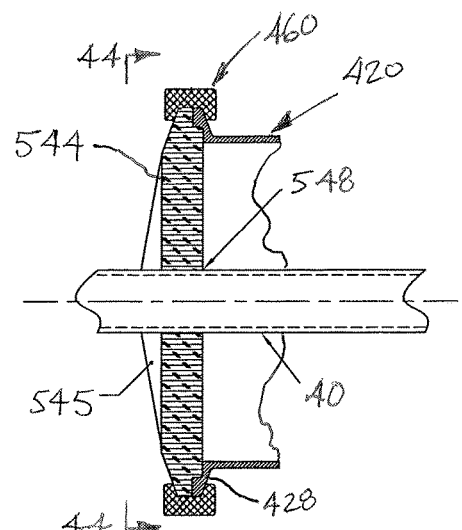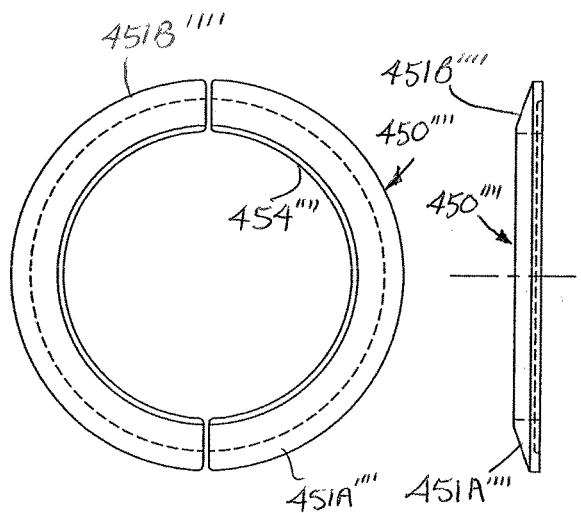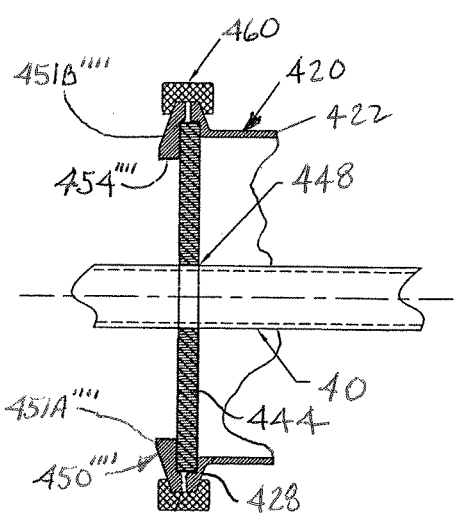
FIG. 44  FIG. 43  FIG. 42  FIG. 41  FIG. 40

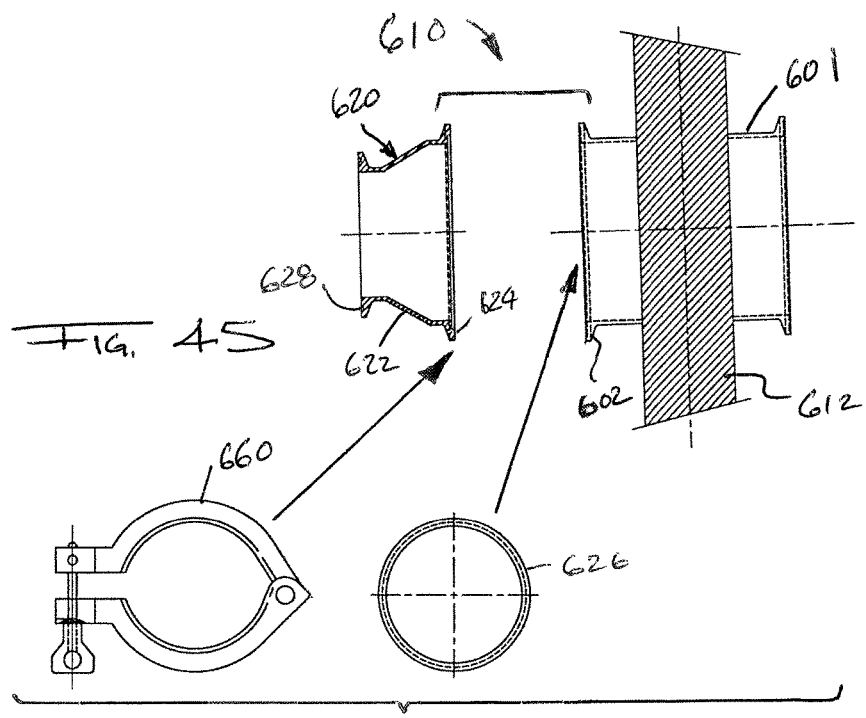
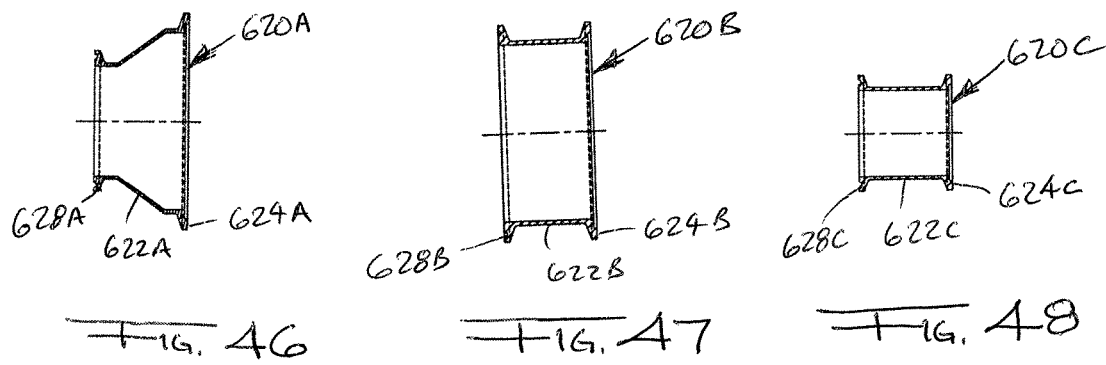

SINGLE USE WALL PASS-THROUGH SYSTEM

INCORPORATION BY REFERENCE

The following documents are incorporated herein by reference as if fully set forth: U.S. patent application Ser. No. 14/501,506, filed Sep. 30, 2014; U.S. patent application Ser. No. 13/853,392, filed Mar. 29, 2013, now U.S. Pat. No. 8,870,230; and U.S. Provisional Application No. 61/617,941, filed Mar. 30, 2012.

BACKGROUND

In chemical, bio, and pharma processing, it is often necessary to deliver a liquid product or agent from a transport or "dirty" processing area to a "clean" area in which processing of the materials takes place. This often involves the use of a wall pass-through in which a tube or hose carrying a liquid chemical, bio, or pharma product must pass through a wall into the clean room and then the tube or hose sealed against the wall opening so that no potentially hazardous material escapes from the clean room through the wall opening once processing begins. This can also be used to keep contaminants from entering the clean room. Further, this can also be used to maintain the integrity and HVAC balance of either room and prevent migration of particulates or unwanted contaminants from one room to another.

The prior known systems involve a series of tubes, fitments, clamps and gaskets which must typically be cleaned after use. It would be desirable to provide a simple, disposable system for transferring products from an outside area into a clean processing room through a wall pass-through which eliminates the need for cleaning at least the components in contact with the materials, while still providing a secure and sealed connection between a clean room separated by a wall from an outside environment and the outside environment.

SUMMARY

A single use wall pass-through system is provided, comprising a tube assembly that is attachable through an opening in a wall, including a tubular body with at least one support flange. A first mounting flange is connected to the support flange around an inner periphery of the first mounting flange and adapted to be connected to the wall around an outer periphery thereof that overlaps the opening. The tube assembly includes a clamping flange connected to each end of the tubular body. A hose or tube is arranged through the tubular body and passes through a hose opening in a one-piece isolating gasket and end cap. A clamp ring clamps the one-piece isolating gasket and end cap to one of the clamping flanges. The tube or hose and the one-piece isolating gasket and end cap are preferably single use.

In another aspect of the invention, there are first and second ones of the support flanges on the tubular body, and a second mounting flange connects the second support flange to an opposite side of the wall from the first mounting flange.

In one preferred arrangement, the one-piece isolating gasket and end cap includes reinforcing ribs.

In another aspect, the hose or tube engages with an interference fit in the hose opening. This allows for the possibility for re-use of the one-piece isolating gasket and end cap, depending on the application and sterility concerns.

In a further alternative, the hose or tube is bonded in the hose opening.

Preferably, the one-piece isolating gasket and end cap is formed from an elastomeric material.

In another embodiment, a single use wall pass-through system is provided having a tube assembly that is attachable through an opening in a wall, including a tubular body with at least one support flange. A first mounting flange is connected to the support flange around an inner periphery of the first mounting flange and adapted to be connected to the wall around an outer periphery thereof that overlaps the opening. The tube assembly includes a clamping flange connected to each end of the tubular body. A hose or tube is arranged through the tubular body and passes through a hose opening in a gasket. A clamp ring clamps the gasket between one of the clamping flanges and a clamp plate. The clamp plate is provided as two clamp plate pieces that are aligned together about a dividing line to form the clamp plate, and a clamp plate hose opening for the hose or tube intersects the dividing line and is at least 60% of a clear cross-section diameter of the tubular body. The tube or hose and the gasket are single use.

Preferably, the clamp ring includes two half-rings that are connectable to one another, and the clamp plate pieces are fixed to respective ones of the half-rings.

In one preferred arrangement, the clamp plate pieces are fixed to respective ones of the half-rings by a weld.

BRIEF DESCRIPTION OF THE DRAWING(S)

The foregoing summary as well as the following detailed description will be better understood when reviewed in conjunction with the appended drawings.

Figure 11:
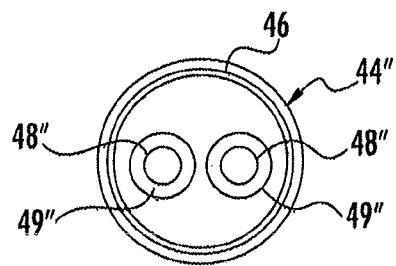

FIG. 11 was is an end view of an alternate embodiment of a gasket.

Figure 12:
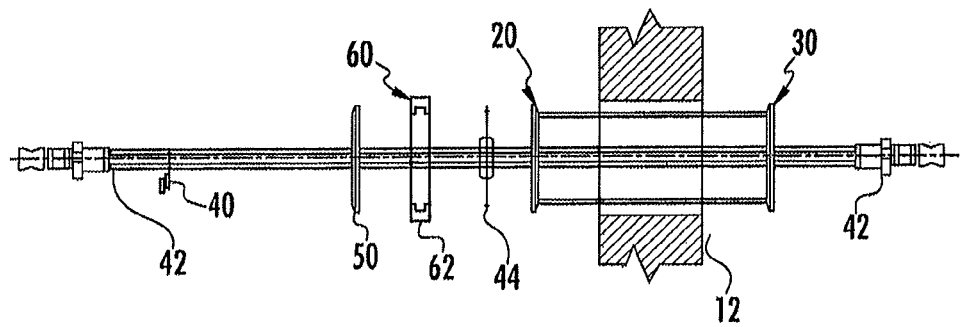

FIG. 12 is a schematic side view showing the installation of a hose or tube through the single use wall pass-through system.

Figure 13:
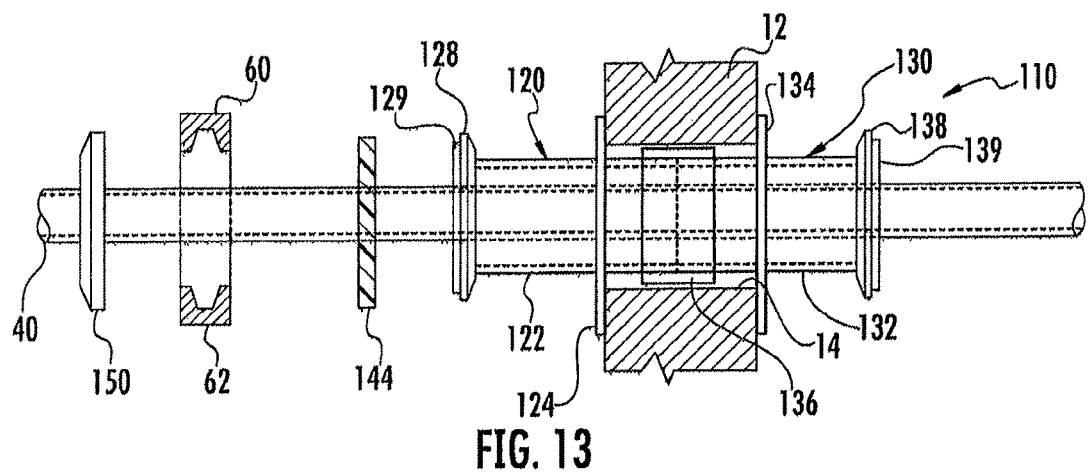

FIG. 13 is a schematic side view of an alternate embodiment of a single use wall pass-through system according to the invention.

Figure 14:
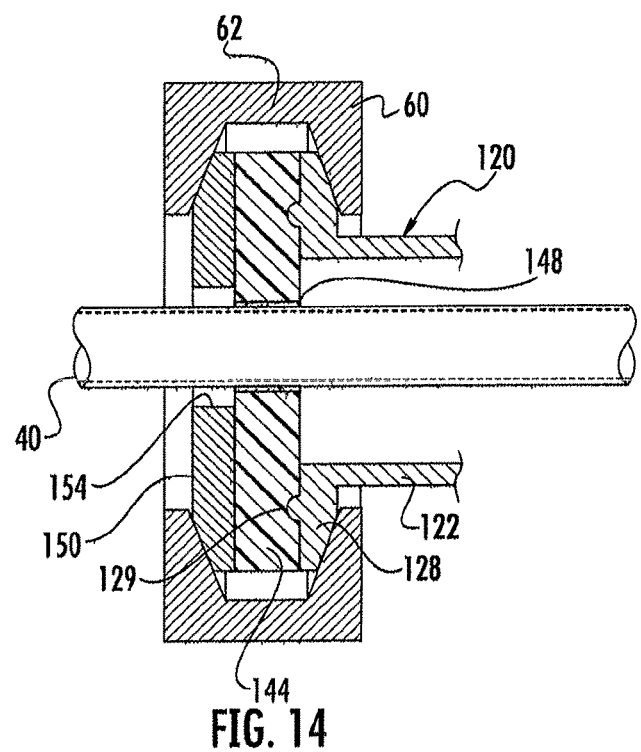

FIG. 14 is an enlarged cross-sectional view through the clamped gasket in the embodiment of FIG. 13.

Figure 15:
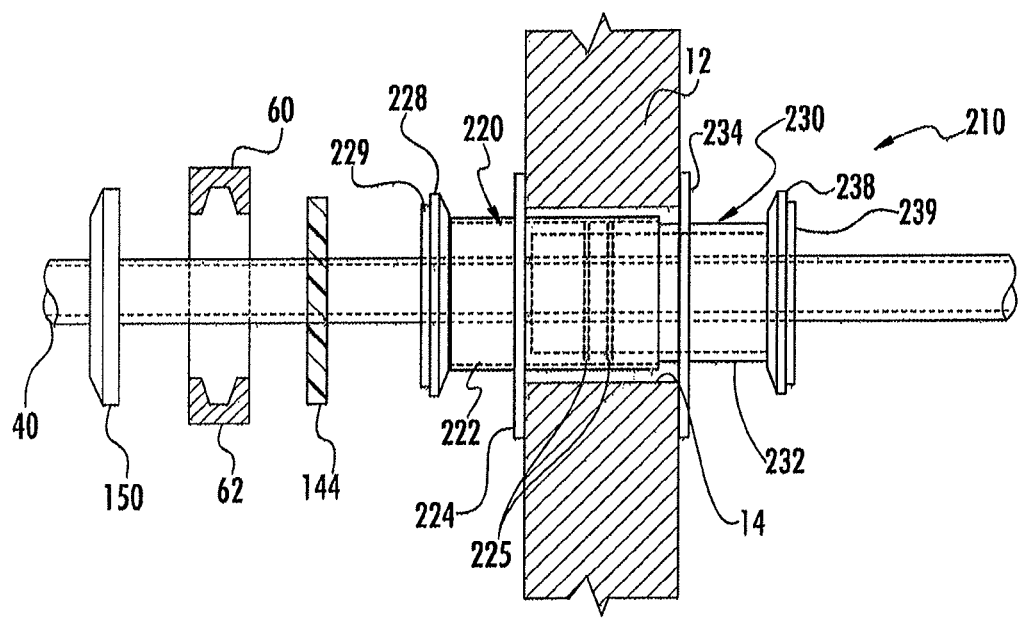

FIG. 15 is a schematic side view of a second alternate embodiment of a single use wall pass-through system according to the invention.

Figures 16, 17:
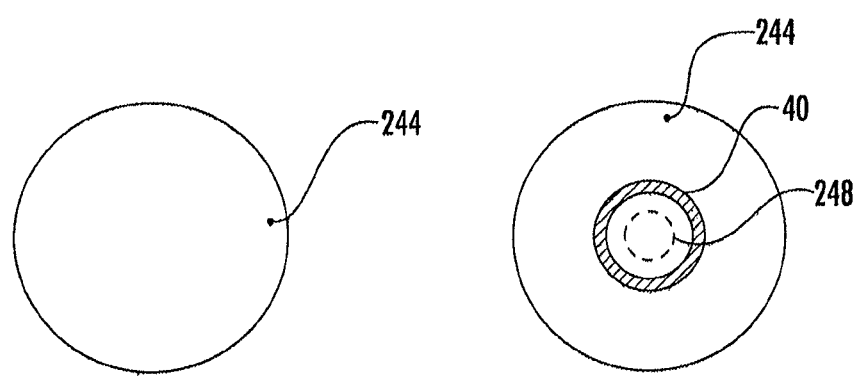

FIG. 16 is an end view of an alternate gasket made from sheet material for the wall pass-through systems of FIGS. 13 and 15.

FIG. 17 is an end view of the gasket of FIG. 16, shown with a hose connected by an interference fit through an opening cut therein.

FIGS. 18-25 are a series of views of the single use wall pass-through system illustrating a method of use in order to prevent contamination in which the first and second fixed wall parts each include an additional side port for connecting a clean process air flow.

Figure 26:
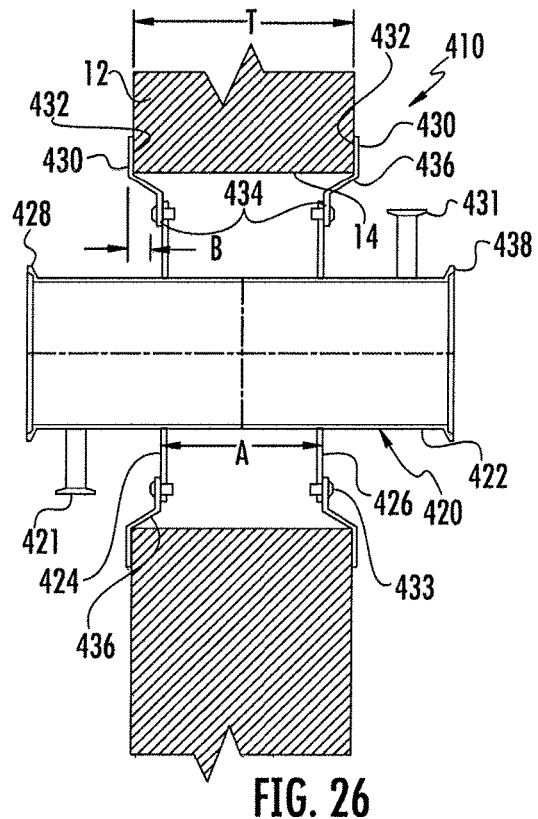

FIG. 26 is a cross-sectional view of a further alternate embodiment of a single use wall pass-through system according to the invention.

Figure 27:
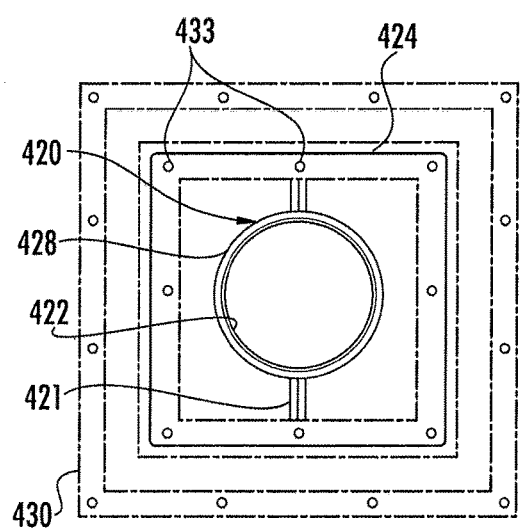

FIG. 27 is an end view of the tube assembly of the fixed wall part in the embodiment of FIG. 26.

Figure 28:
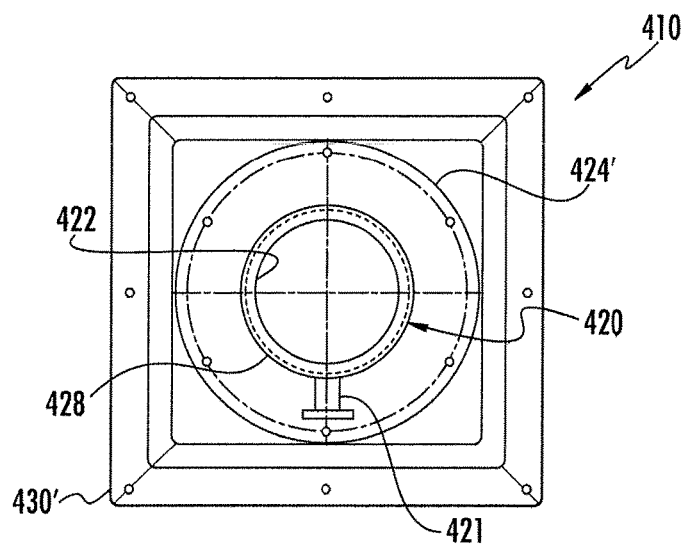

FIG. 28 is a detail view of the attachment flange used to mount the tube assembly of FIG. 27 to the wall.

Figure 29:
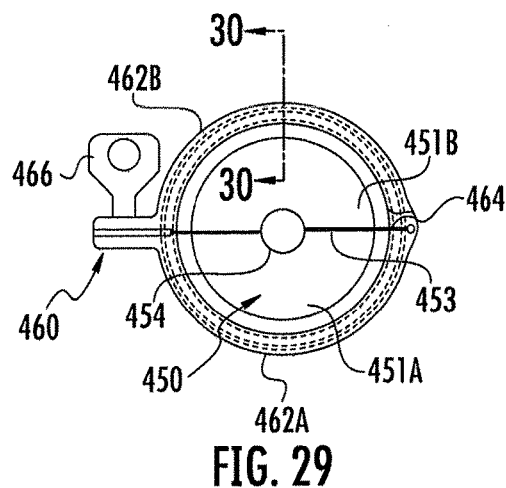

FIG. 29 is an elevational view of a split clamp plate and clamp assembly for use with the single use wall pass-through systems according to the invention.

Figure 30:
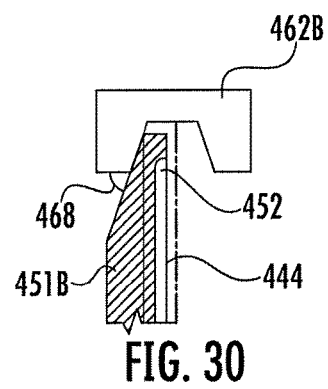

FIG. 30 is an enlarged cross-sectional view taken along line 30-30 in FIG. 29.

Figure 31:
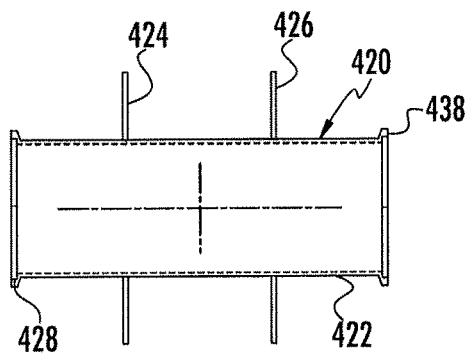

FIG. 31 is a detail view of the tube assembly of the fixed wall part shown in FIG. 27.

Figure 32:
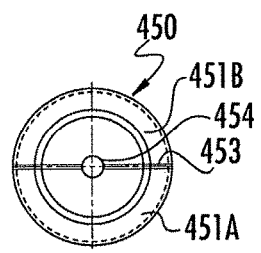

FIG. 32 is an elevational view of a split clamp plate with a single hose pass-thru opening for use with the single use wall pass-through systems according to the invention.

Figure 33:
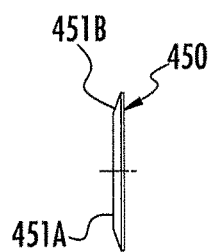

FIG. 33 is a side view of the split clamp plate shown in FIG. 32.

Figure 34:
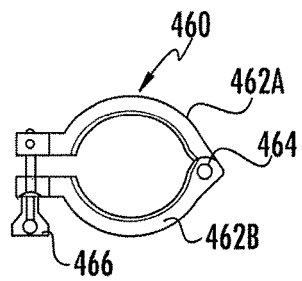

FIG. 34 is an elevational view of a clamp for use with the split clamp plate in FIG. 33.

FIG. 35 is an elevational view of a split clamp plate with two hose pass-thru openings for use with the single use wall pass-through systems according to the invention.

FIG. 36 is an elevational view of the split clamp plate of FIG. 35.

FIG. 37 is a cross-sectional view of a split clamp plate having a hose opening with a straight hose engaging surface.

FIG. 38 is a cross-sectional view of a split clamp plate having a hose opening with a convex hose engaging surface.

FIG. 39 is a cross-sectional view of a split clamp plate having a hose opening with a beveled hose engaging surface.

FIG. 40 is an enlarged cross-sectional view through a clamped gasket using a split clamp plate with a single hose pass-thru opening for use with the single use wall pass-through systems according to the invention according to another preferred arrangement.

FIG. 41 is an elevational view of the split clamp plate of FIG. 41.

FIG. 42 is a front elevational view of the split claim plate of FIGS. 40 and 41.

FIG. 43 is an enlarged cross-sectional view through a one-piece isolating gasket and end cap with a single hose pass-thru opening for use with the single use wall pass-through systems according to the invention according to another preferred arrangement.

FIG. 44 is a front elevational view of the arrangement of FIG. 43 taken along line 44-44 in FIG. 43.

FIG. 45 is an exploded view showing another embodiment with an adaptor for use in connection with an existing hygienic flange portal in order to convert to a wall pass-through system according to the invention.

FIGS. 46-48 are alternate embodiments of the adaptor for use in connection with the conversion kit shown in FIG. 45.

Figure 49:
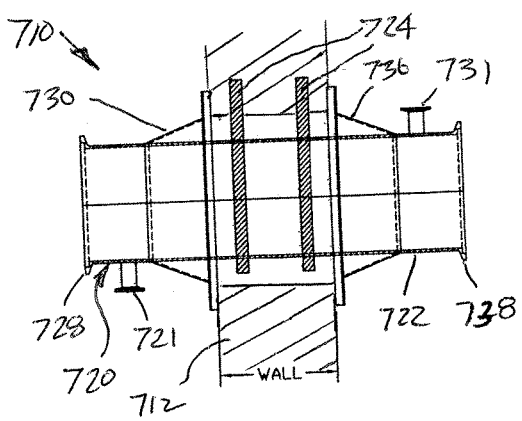

FIG. 49 is a cross-sectional view through another embodiment of a single use wall pass-through system according to the invention.

Figure 50:
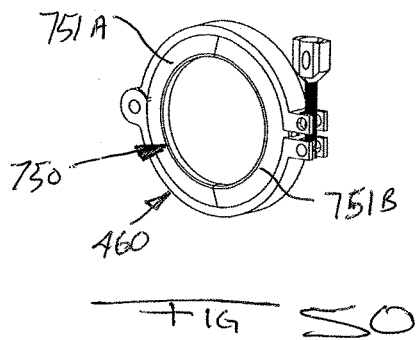

FIG. 50 is a perspective view of a clamp and split end cap for use in connection with the tube assembly of the wall pass-through system of FIG. 49.

Figure 51:
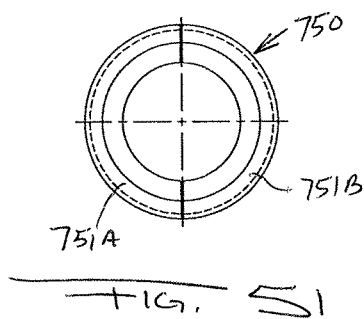
Figure 52:
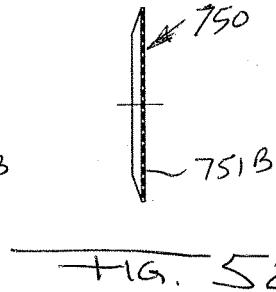

FIGS. 51 and 52 are a front and side view of a split end cap used in connection with the wall pass-through system of FIG. 49.

Figure 53:
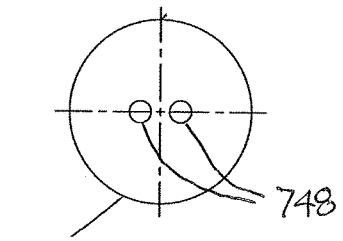

FIG. 53 is a view of an embodiment of an isolator gasket that is clamped to the clamping flange of the single use wall pass-through system of FIG. 49 using the clamp and split end cap of FIGS. 50-52.

Figure 54:
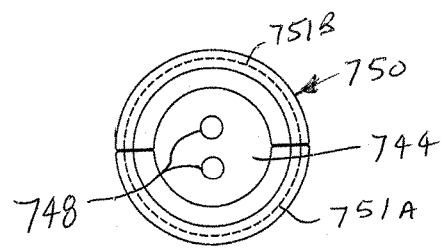

FIG. 54 is an end view showing the isolator gasket, split end cap and clamping plates arranged on a clamping flange of the single use wall pass-through system shown in FIG. 49.

DETAILED DESCRIPTION OF THE PREFERRED EMBODIMENT

Certain terminology is used in the following description for convenience only and is not considered limiting. Words such as "top", "bottom", "left", and "right" indicate directions in the drawings to which reference is made, and are not considered limiting. This terminology includes the words specifically noted above and derivatives thereof and words of similar import. Additionally, the terms "a" and "one" are defined as including one or more of the referenced item unless specifically noted.

Figure 1:
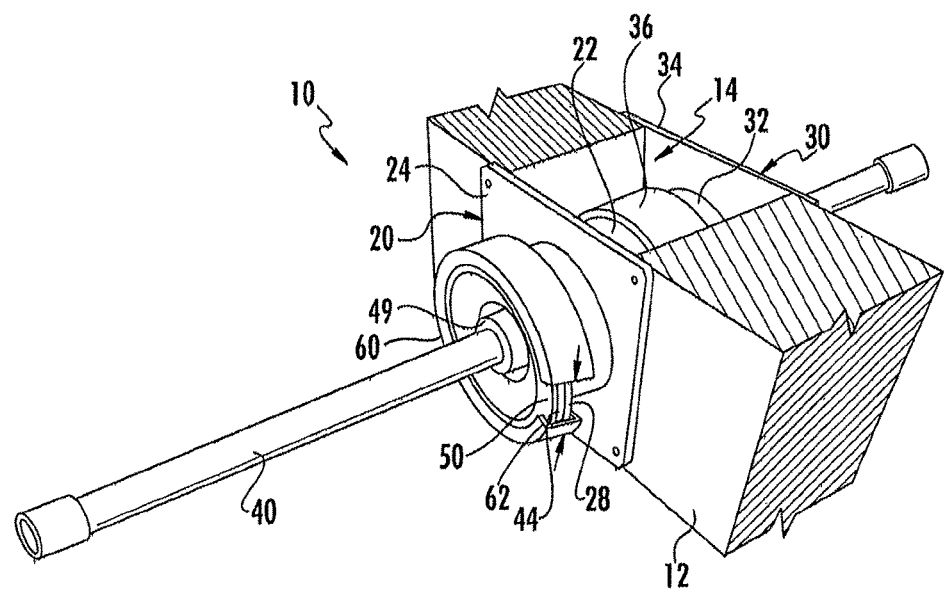
FIG. 1 is a perspective view of a single use wall pass-through system according to the invention.

Referring to FIG. 1, a single use wall pass-through system 10 is shown. The pass-through system 10 is mounted through a wall 12, shown partially broken away, through an opening 14 defined in the wall 12.

Figure 2:
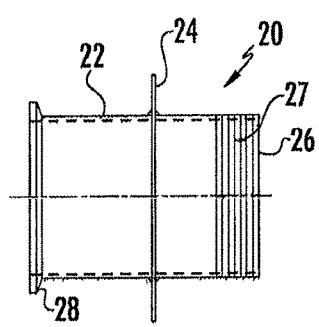
FIG. 2 is a side view of a first fixed wall part used in the single use wall pass-through system shown in FIG. 1.

Referring to FIGS. 1-4, the pass-through system 10 includes a first fixed wall part 20 having a tubular body 22 with a mounting flange 24 located thereon. A coupling interface 26 is located at a portion of the tubular body 22 that is adapted to be inserted into the opening 14 in the wall 12. As shown in FIG. 2, the coupling interface 26 on the first fixed wall part 20 can utilize external threads 27. Alternatively, the tubular body 22 does not require threads, and an alternate arrangement can be provided. A clamping flange 28 is located on the side of the first fixed wall part 20 that extends out from the wall 12. Preferably, the first fixed wall part 20 is made of stainless steel and is a welded assembly. Alternatively, it can be made from other materials, such as other types of metal or polymeric materials.

Figure 3:
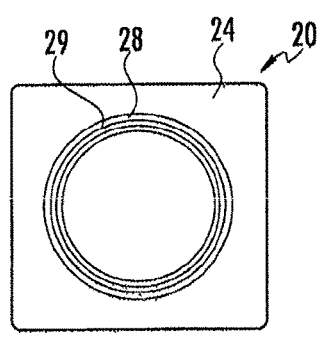
FIG. 3 is an end view of the first fixed wall part shown in FIG. 2.

As shown in FIG. 3, preferably the clamping flange 28 includes a beveled edge on one side. A gasket groove 29 can be provided on the other side which is adapted to receive a bead located on the gasket, which is discussed in detail further below.

Figure 4:
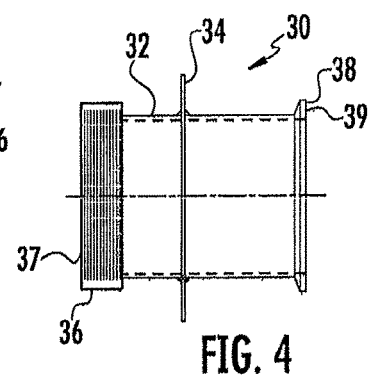
FIG. 4 is a side view of a second fixed wall part used in the single use wall pass-through system shown in FIG. 1.

Referring to FIG. 4, the second fixed wall part 30 is shown in detail. The second fixed wall part 30 is similar to the first fixed wall part 20, and includes a tubular body 32 along with a mounting flange 34 for connection to the wall 12 around the opening 14. A coupling interface 36 is located on the tubular body 32 and preferably is in the form of a sleeve 37 having internal threads which are complementary to the external threads 27 on the first fixed wall part 20. Alternatively, no threads are required. A clamping flange 38 is located on the part of the second fixed wall part 30 that extends out from the wall 12. Preferably, the clamping flange 38 also includes a gasket groove 39 for receiving a bead on the gasket.

As shown in FIG. 1, the first and second fixed wall parts 20, 30 can be mounted to the wall 12 by inserting them into the opening 14 from opposite sides of the wall 12 and connecting them together via the coupling interface 26, 36 on the first and second fixed wall parts 20, 30 within the wall 12. In the embodiment shown using a threaded connection, the distance between the mounting flanges 24, 34 can be adjusted depending upon the depth of engagement of the threads 27 on the first fixed wall part in the sleeve 37 on the second fixed wall part 30. Alternatively, if no threads are provided on either the fixed wall parts 20, 30, the sleeve 37 would be unthreaded and would provide a slip fit between the first and second wall parts which can be sealed using an adhesive or sealant or with o-rings located around the circumference of the interface.

Figure 5:
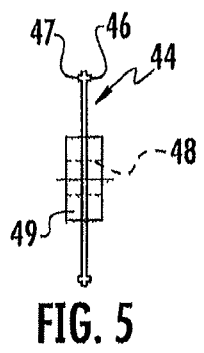
FIG. 5 is a side view of a gasket for the single-use wall pass-through system.
Figure 6:
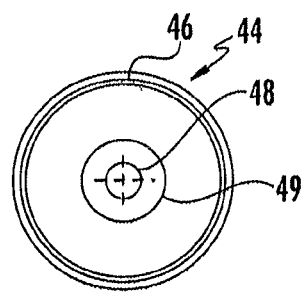
FIG. 6 is an end view of the gasket shown in FIG. 5.

Referring to FIGS. 5 and 6, a first embodiment of a gasket 44 is shown. Here the gasket 44 includes clamping beads 46, 47 that extend around the periphery on each side of the gasket 44. A center opening 48 is defined through the gasket 44 and is surrounded by reinforcement 49. As shown in FIG. 1, the gasket 44 is preferably located on a hose or tube 40 that is extending through the wall pass-through. The hose or tube 40 is preferably made of silicone or a thermoplastic material and is a single use hose or tube for transferring material from one side of the wall 12, such as an outside corridor, to the other side of the wall 12, which can be a clean room or processing area. The gasket 44 is preferably made from silicone or a thermoplastic material, and is connected to the hose using silicone or an adhesive of chemical bond.

Figure 7:
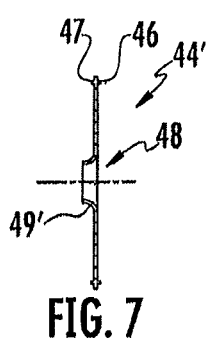
FIG. 7 is a side view of an alternate embodiment of a gasket for use in connection with the single use wall pass-through system shown in FIG. 1.
Figure 8:
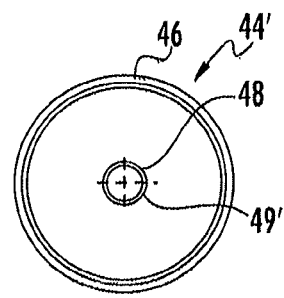
FIG. 8 is an end view of the gasket shown in FIG. 7.

Referring to FIGS. 7 and 8, a second embodiment of the gasket 44' is shown. Here the gasket 44' is the same as the gasket 44 except that the reinforcement 49' only extends in one direction from a surface of the gasket 44' and is not bonded or adhered to the hose or tube. This allows gasket 44' to move along the axis of the hose or tube and fit into the mating flange without stretching or compressing the hose or tube.

Figure 9:
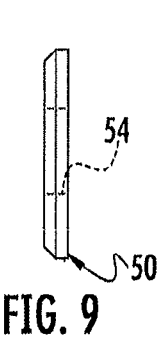
FIG. 9 is a side view of a clamp plate used in connection with the single use wall pass-through system shown in FIG. 1.
Figure 10:
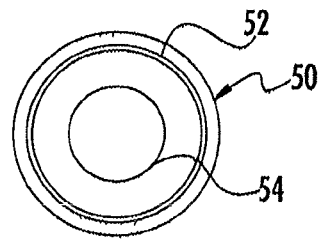
FIG. 10 is an end view of the clamp plate.

Referring to FIGS. 9 and 10, a clamp plate 50 is shown. The clamp plate 50 preferably has the same shape as the clamping flange 28, 38 on one or both of the fixed wall parts 20, 30. This includes a beveled edge around the periphery on one side, as well as a gasket groove 52 on the opposite side which is adapted to receive a clamping bead 46, 47 on one side of the gasket 44. A least one opening 54 is provided which is large enough to accommodate the reinforcement 49 on the gasket 44. The opening 54 can be circular or slotted to allow the insertion of the clamp plate 50, without having to thread the tube end 40, or the fitting 42 therethrough. More than one opening 54 could be provided, depending upon the gasket configuration and the number of hoses or tubes 40 that are to be passed through the wall pass-through.

Referring to FIG. 12, the installation of a hose or tube 40 through the wall pass-through system 10 is shown in detail. Here a gasket 44 has been bonded or adhered to the hose or tube 40 and the gasket 44 is aligned so that the clamping bead 46 on one side of the gasket is received at least partially within the gasket groove 29 on the clamping flange 28 of the first fixed wall part 20. The clamp plate 50, which has been placed over the hose or tube 40, is aligned with the clamping flange 28 with the gasket 44 located therebetween, and the clamping bead 47 on the opposite side of the gasket 44 being at least partially received within the gasket groove 52 of the clamping plate 50. A clamp ring 60, shown in FIGS. 1 and 12 is then placed around the clamping flange 28, the gasket 44 and the clamping plate 50 and tightened. The clamp ring 60 has a channel-shaped cross-section having inside bevels which are adapted to force the clamping plate 50 against the clamping flange 28 via contact with the bevels located on the opposite sides of the clamp plate 50 and the clamping flange 28. The clamp ring 60 is a standard sanitary flange clamp and can be tightened via a threaded coupling represented only schematically via arrows shown in FIG. 1 in order to tighten the clamp ring 60. The channel-shaped cross-section 62 of the clamp ring 60 is shown most clearly in FIG. 12 and the bevels on the back side of the clamping plate 50 and the clamping flange 28 are shown most clearly in FIGS. 9 and 2, respectively.

Once installed, material can then be transferred through the hose or tube 40 from outside of the wall 12 to an inside of the wall 12 without the risks of any materials, which could be contaminants or hazardous materials, escaping from one side of the wall 12 to the other side of the wall 12. After transfer of the material and any processing within the clean room or other area delimited via the wall 12 is completed, the tube 40 and gasket 44 can be removed and discarded.

Referring to FIG. 11, an alternate configuration for the gasket 44" is shown. Here two openings 48" are shown having reinforcements 49". Alternate gasket arrangements can be provided allowing multiple tubes or hoses 40 to be passed through the opening 14 in the wall 12 when multiple materials are being used or required for processing.

Referring to FIGS. 13 and 14, another embodiment of the pass-through system 110 is shown and includes a first fixed wall part 120 having a tubular body 122 with a mounting flange 124 located thereon. A clamping flange 128 is located on the side of the first fixed wall part 120 that extends out from the wall 12. The clamping flange 128 includes an annular bead 129 extending outwardly therefrom for clamping into a flat gasket 144, described in detail below. Preferably, the first fixed wall part 120 is made of stainless steel and is a welded assembly. Alternatively, it can be made from other materials, such as other types of metal or polymeric materials.

As shown in FIG. 14, preferably the clamping flange 128 includes a beveled edge on one side similar to the flange 28 above to generate an axial force as the clamping band 60 is tightened.

Still with reference to FIG. 12, the second fixed wall part 130 is shown in detail. The second fixed wall part 130 is similar to the first fixed wall part 120, and includes a tubular body 132 along with a mounting flange 134 for connection to the wall 12 around the opening 14. A coupling 136 is located on the tubular body 132 for coupling to the first fixed wall part 120. A clamping flange 138 is located on the part of the second fixed wall part 30 that extends out from the wall 12. Preferably, the clamping flange 138 includes an annular bead 139 extending outwardly therefrom for clamping into a flat gasket 144, if desired, in a similar manner shown for the clamping flange 128.

The first and second fixed wall parts 120, 130 are mounted to the wall 12 by inserting them into the opening 14 from opposite sides of the wall 12 and connecting them together via the coupling 136, which can be a slip fit coupling, with an adhesive or sealant provided between the coupling 136 and the tubular bodies 122, 132.

Still with reference to FIGS. 13 and 14, in the embodiment 110, the gasket 144 is formed of flat sheet material. A center opening 148 is defined through the gasket 144. The flat sheet material is thick enough that no reinforcement is required, and the flat sheet material can be easily cut and/or punched to make form the desired gasket to allow one, two or more hoses or tubes 40 to be accommodated. The hose or tube 40 is preferably made of silicone or a thermoplastic material and is a single use hose or tube for transferring material from one side of the wall 12, such as an outside corridor, to the other side of the wall 12, which can be a clean room or processing area. The gasket 144 is preferably made from silicone or a thermoplastic flat sheet material, and is connected to the hose 40 using silicone or an adhesive of chemical bond.

During clamping, the annular bead 129 on the flange 128 is pressed into the flat gasket material and forms a tight seal upon clamping of the clamping plate 150 against the clamping flange 128 using the clamp 60. Optionally, a bead similar to the bead 129 can be provided on the clamping plate 150.

This arrangement 110 is economical for the production of the single use system components since no molding of the gasket 144 is required as it can be punched or cut from sheet material. Further, this embodiment can be used in connection with larger sized openings, for example, 12 inch diameter or larger tubular bodies 122, 132.

Referring to FIG. 15, another embodiment of the pass-through system 210 is shown and includes a first fixed wall part 220 having a tubular body 222 with a mounting flange 224 located thereon. A clamping flange 228 is located on the side of the first fixed wall part 220 that extends out from the wall 12. The clamping flange 228 includes an annular bead 229 extending outwardly therefrom for clamping into a flat gasket 144, as described above. Preferably, the first fixed wall part 220 is made of stainless steel and is a welded assembly. Alternatively, it can be made from other materials, such as other types of metal or polymeric materials. The clamping flange 228 includes a beveled edge on one side similar to the flange 28, 128 above to generate an axial force as the clamping band 60 is tightened.

Still with reference to FIG. 15, the second fixed wall part 230 is shown in detail. The second fixed wall part 230 is similar to the first fixed wall part 220, and includes a tubular body 232 along with a mounting flange 234 for connection to the wall 12 around the opening 14. The tubular body 232 has a smaller outside diameter than the inside diameter of the tubular body 222 to allow a slip fit therein. A clamping flange 238 is located on the part of the second fixed wall part 30 that extends out from the wall 12. Preferably, the clamping flange 238 includes an annular bead 239 extending outwardly therefrom for clamping into a flat gasket, if desired, in a similar manner shown for the clamping flange 228.

The tubular bodies 222, 232 are not threaded and sized so that one slips inside the other, and a pair of elastomeric o-rings 225 are located inside the tubular body 222 on its inner circumference, or in grooves specifically provided for the o-rings 225, and the 0-rings 225 are compressed by the outer circumference of the inner tubular body 232 as the tubular bodies 222, 232 are slid together, making an air-tight seal without the need for sealants or adhesives.

The gasket 144 with the center opening 148 can be used in the arrangement 210 in a similar manner to the arrangement 110 as discussed above. Installation and clamping are the same as discussed above in connection with the arrangement 110. Once the material transfer is complete, the single use hose or tube 40 and the gasket 144 are disposed of.

Referring to FIGS. 16 and 17, an alternate gasket 244 for use with the arrangements 110, 210 discussed above is provided. The gasket 244 is preferably made from silicone or a thermoplastic flat sheet material, and is connected to the hose 40 only by an interference fit. This provides a reduced cost since the gasket 244 can just be cut from sheet material, as shown in FIG. 16, and then an undersized hole 248 is cut, represented in dashed lines in FIG. 17, and the tube 40 is forced through the hole, providing an interference fit due to the resilient property of the sheet material. This eliminates the need for adhesives in order to connect to the tube 40.

The gasket 244 can also be used in the form shown in FIG. 16, without any hole 248 cut therein, in which case the arrangements 110, 201 could just be used as a sealed wall pass-through chamber by keeping a the uncut gasket 244 in place on one side as any materials to be passed into or out of the clean room are loaded, and then a cover formed by another gasket 244 is placed on the open, loading side prior to the other gasket 244 being removed from the unloading side. This allows additional functionality for these arrangements in an extremely cost effective manner.

Figure 18:
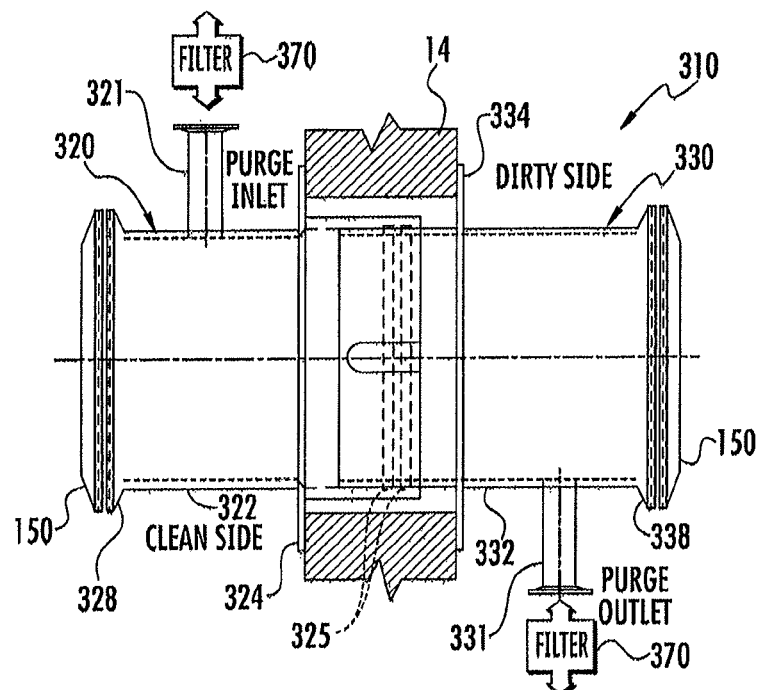

Referring now to FIGS. 18-25, a method for use of the single use wall pass-through system is shown with a further embodiment of the system 310, which includes an optional purge connection. As shown in FIG. 18, the system 310 is similar to the system 210 discussed above, and includes the first fixed wall part 320 and the second fixed wall part 330 with the tubular bodies 322, 332 and wall flanges 324, 334 for attachment on both sides of an opening in a wall 14. O-rings 325, which are similar to the O-rings 225 above, are used to seal the first and second fixed wall parts 320, 330 together. Here, an inlet purge tube 321 is connected to the first tubular body 322 and an outlet purge tube 331 is connected to the second tubular body 332. The inlet and outlet purge tubes 321, 331 allow process air to be carried into and from the enclosed area to allow connections to be made without contamination traveling from the "Clean Side" to the "Dirty Side" of a clean room wall. The inlet and outlet purge tubes preferably have air filters 370 connected at the openings on in-line with the process air connections. Clamping flanges 328, 338 are located at the respective ends for attachment of clamp plates 150 and associated gaskets 44, 144, 244. The clamps 60 are not shown for clarity.

Figure 19:
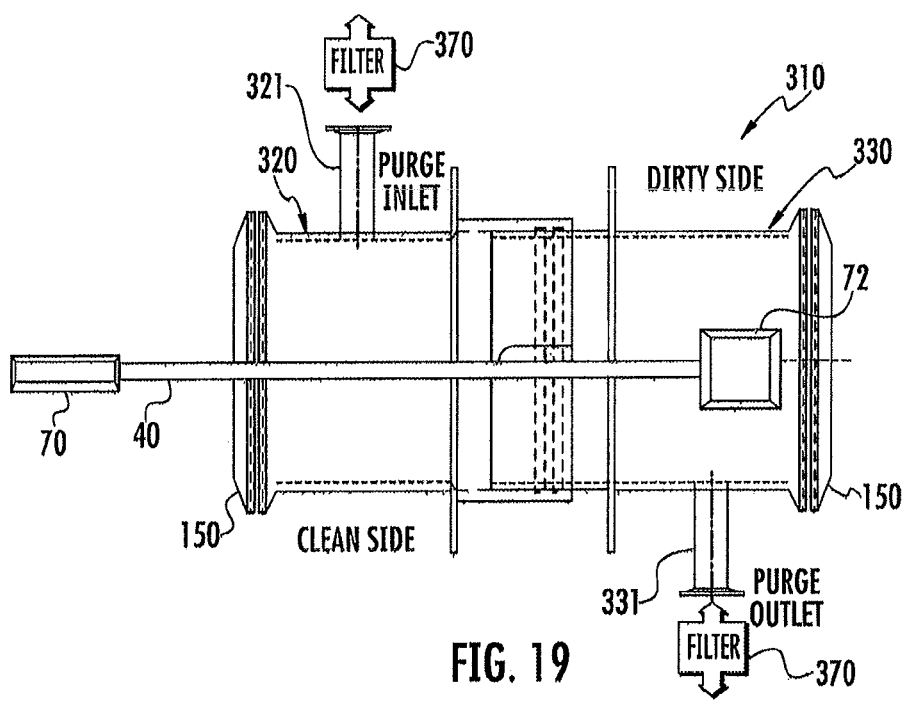

A process for installing a tube 40 through the single use wall pass-through system 310 starts with the system 310 in the closed-off state as shown in FIG. 18. Here, the clamp plates 150 are solid plates preferably installed with a non-perforated gasket 144, as discussed above, or can be clamp plates 150 with openings that are installed with a non-perforated gasket 244. Purge inlet and outlet air filters 370 are installed. These filters 370 are preferably able to capture micro-organisms, and can be 0.2 or 0.1 micron filters. The clean side end cap 150 and gasket 244 are removed and the interior of the system, defined by the tubular bodies 322, 332, is wiped down with a cleaner and/or disinfectant, such as alcohol. Referring to FIG. 19, the tube 40 is installed through a hole cut in the gasket 244 with an interference fit, or one of the other gaskets 44, 144 above, and the end of the tube 40, which is closed off with a cap 72, is placed into the inside of the pass-through system 310. The clamp plate 150 is re-installed and clamped in place on the Clean Side. Preferably, the tube 40 is also closed off with a cap 70 on the Clean Side.

Figure 20:
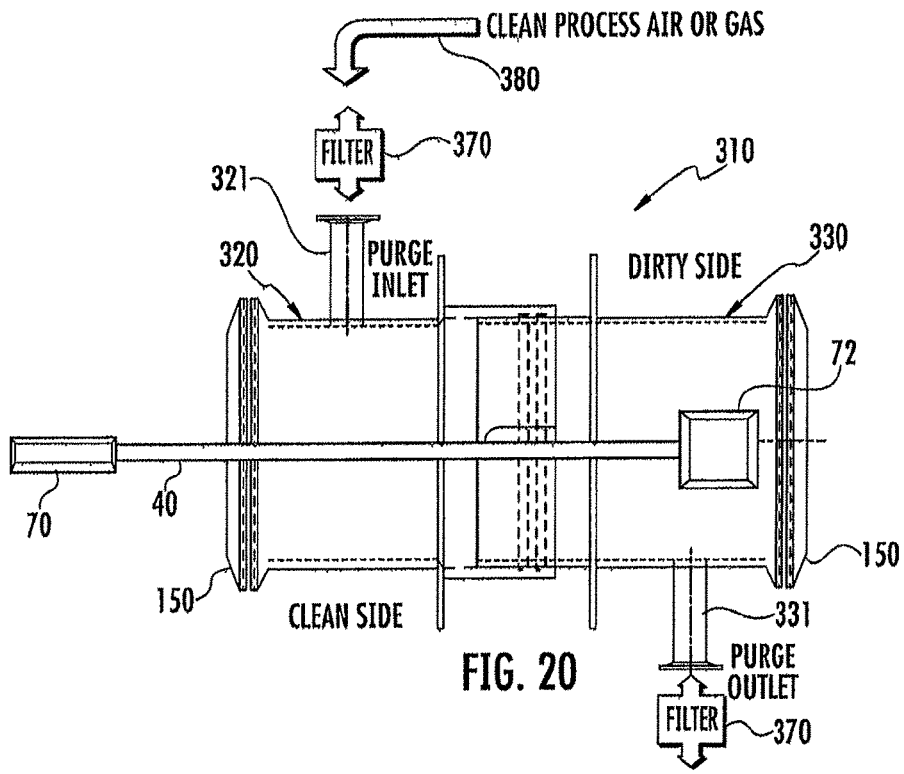

Referring now to FIG. 20, the sealed chamber in the pass-through system 310 is now pressurized with process air from a process air source 380. The Dirty Side end cap 150 and any associated gasket 244 I then removed. The process air flow ensures that any air flow is outward into the Dirty Side.

Figure 21:
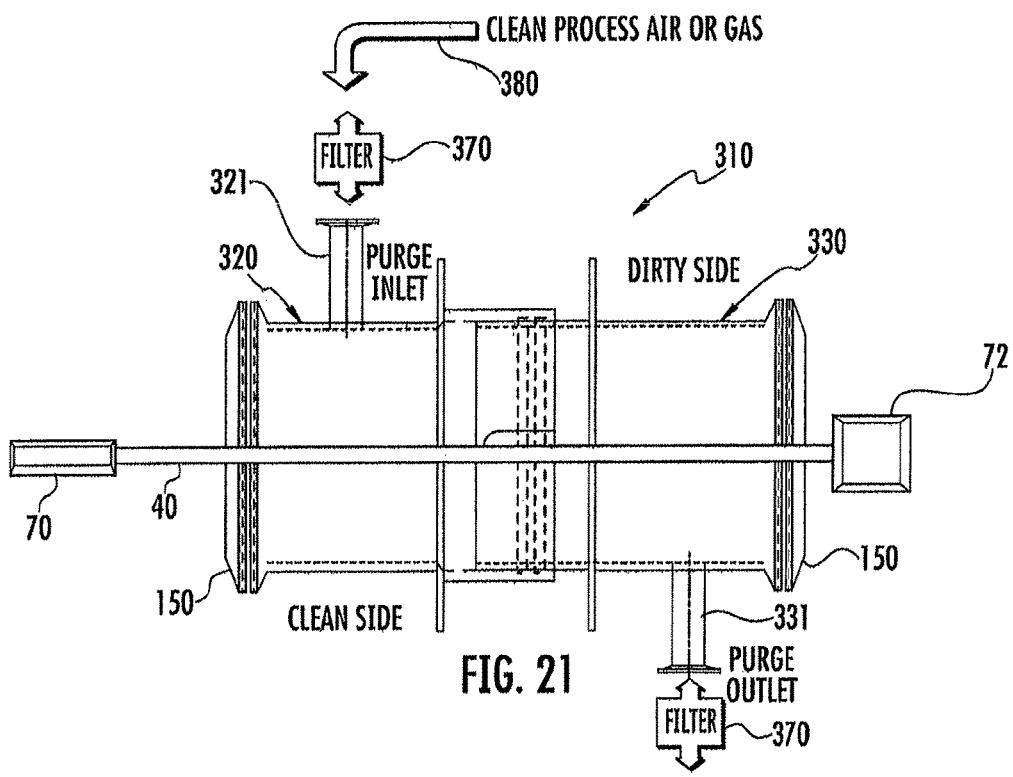

As shown in FIG. 21, the tube 40 is now pulled into the Dirty Side, where a seal or gasket 244, 144, 44 is attached to the tube 40 and a clamp plate 150 is then re-installed and clamped in position so that the Dirty Side is again closed, with the tube 40 and end cap 72 extending through the pass-through system 310.

Figure 22:
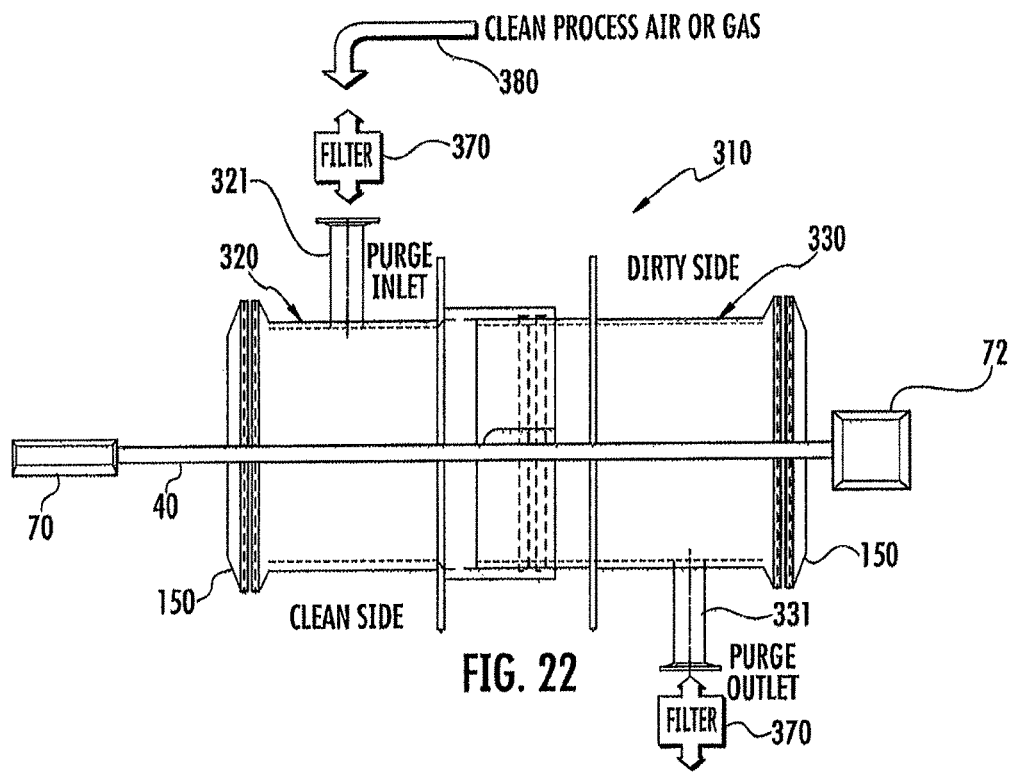

FIG. 22 shows the tube 40 extending through the pass-through system 310 now ready to use to transfer material through the tube 40 from the Clean Side to the Dirty Side or vice versa. Here, the process air source 380 can optionally be turned off.

Figure 23:
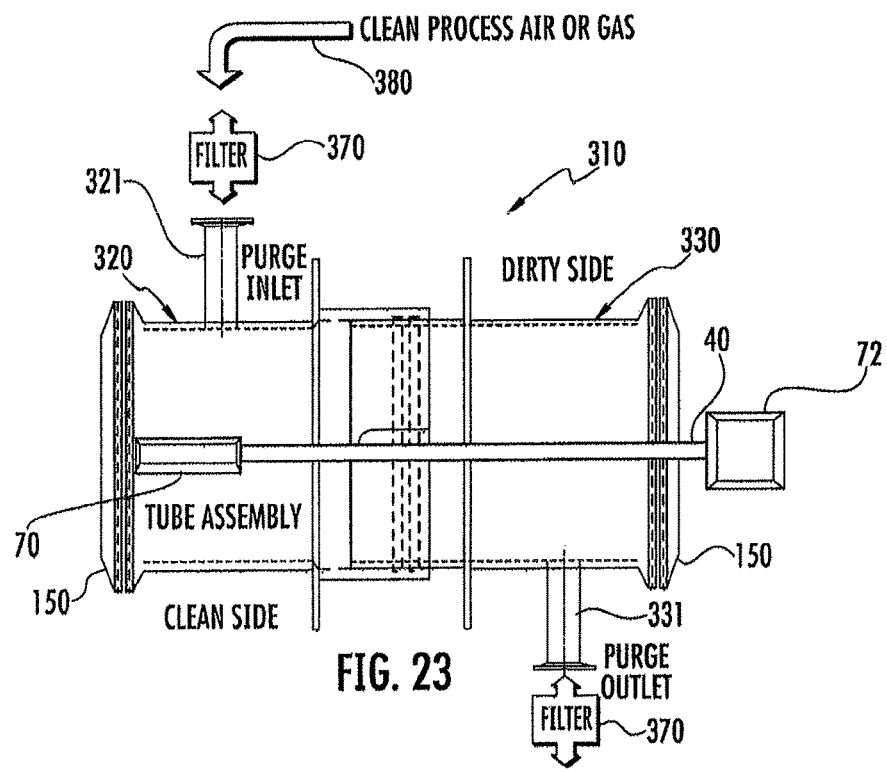

FIG. 23 shows the removal process for the tube 40 after the transfer is complete. Here, the end of the tube 40 on the Clean Side is capped or heat sealed. With the process air source 380 on, the clean Side clamp plate 150 and associated gasket are removed, and the tube 40 and attached gasket are placed in the chamber. A clamp plate 150, which can be solid, and an associated non-perforated gasket 244 are then re-installed to close off the Clean Side.

Figure 24:
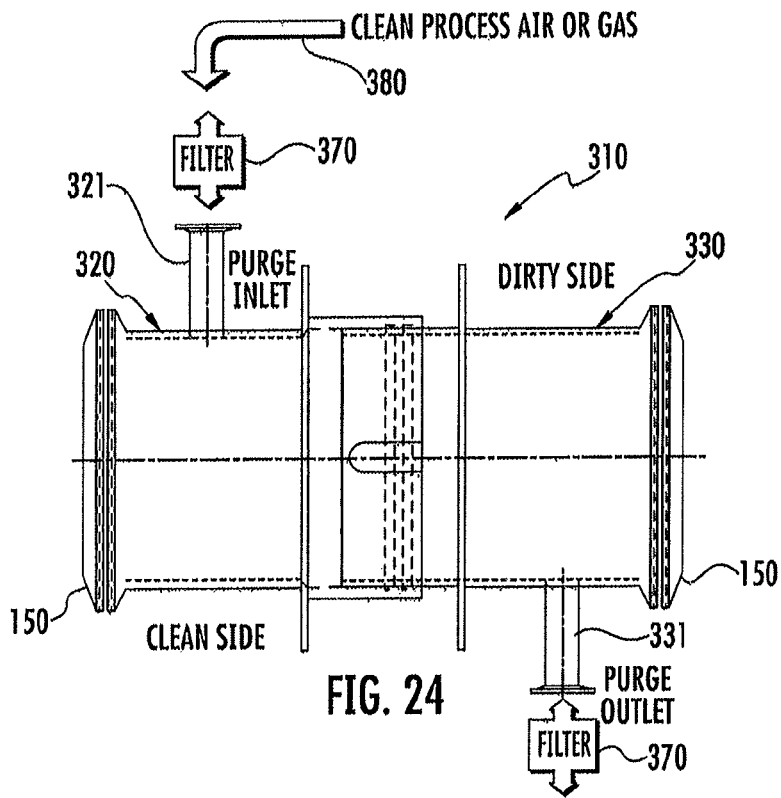

FIG. 24 shows the Dirty Side clamp plate 150 being removed, so that the used tube assembly 40 along with the associated gaskets attached to it are removed. A clamp plate 150, which can be solid, and an associated non-perforated gasket 244 are then re-installed to close off the Dirty Side.

Figure 25:
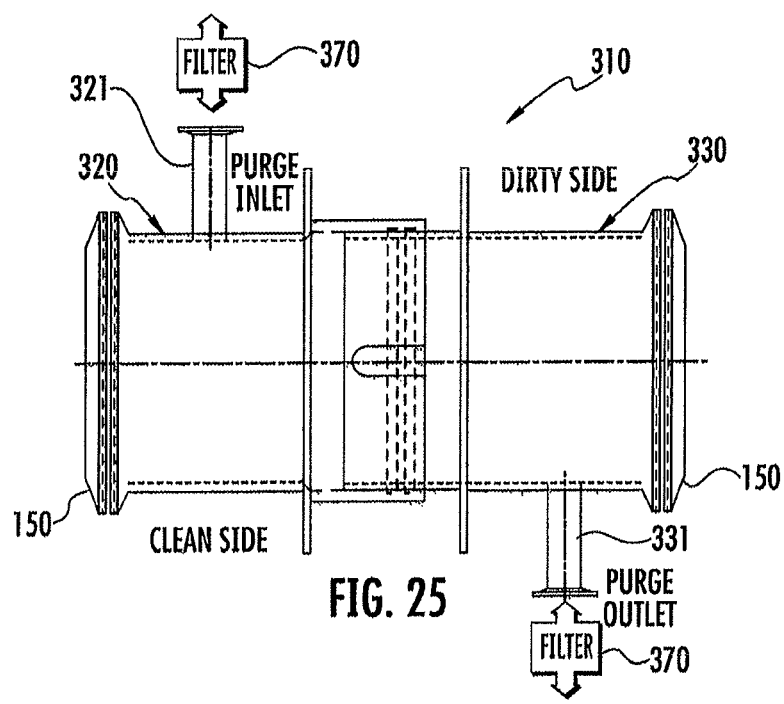

FIG. 25 shows the wall pass-through system 310 back at the initial state and the process air source 380 is turned off or disconnected.

Referring to FIGS. 26 and 27, another embodiment of a single use wall pass-through system 410 is provided. In this embodiment, a tube assembly 420 is attached through the opening 14 in the wall 12. The tube assembly 420 includes a tubular body 422 with at least one support flange 424, 426. Preferably, two of the support flanges 424, 426 are provided spaced axially apart from one another. A first mounting flange 430 is connected to the support flange 424 around an inner periphery of the first mounting flange 430 and adapted to be connected to the wall 12 around an outer periphery thereof that overlaps the opening 14. In this embodiment, the outer periphery of the support flanges 424, 426 is generally rectilinear, as shown in FIG. 27, and the mounting flange 430 has a corresponding opening. Fasteners 433 connect the support flange 424 to the mounting flange 430 in the overlap area. A sealant is preferably also applied to the faying surface during assembly. FIG. 28 shows an alternate arrangement where the outer periphery of the support flange 424' is generally circular, and the mounting flange 430' has a correspondingly shaped inner periphery with a generally circular opening.

Preferably, a second mounting flange 430 connects the second support flange 426 to an opposite side of the wall 12 from the first mounting flange 430. Preferably, the mounting flanges 430 include a wall mounting surface 432 and a support flange mounting surface 434, and the wall mounting surface 432 is axially offset by an angled offset surface 436 from the support flange mounting surface 434. Here, the axial offset B is determined by a wall thickness T and a distance A between the first and second support flanges 424, 426, and divided by two (B=(T−A)/2) so that the tube assembly 420 is centered in the wall opening 14. Different mounting flanges 430 having a range of axial offsets B can be provided to accommodate walls 12 of different thicknesses. During installation, a sealant is also placed between the wall mounting surface 432 and the wall 12.

The tube assembly 420 includes a clamping flange 428, 438 connected to each end of the tubular body 422. Preferably, the tube assembly 420 is made from stainless steel components that are welded together. The tube assembly can be provided with purge tubes 421, 431, which are used in the same manner as the purge tubes 321, 331 discussed above. Alternatively, as shown in FIG. 31, the tube assembly 420 can be provided without purge tubes. It is further noted that the tube assembly 420 as shown in FIG. 31 can be used directly as a wall pass-through by making the first and second support flanges 424, 426 large enough to cover the wall opening 14, and only providing of the support flanges 424, 426 pre-assembled to the tubular body 422 by welding. The other support flange 426, 424 can be attached at installation using various methods, such as welding or a sealant or adhesive. As a further alternative, the first and second support flanges 424, 426 could be formed of an elastomeric material for an interference fit or bonded connection with the tubular body 422.

A hose or tube 40 can arranged through the tubular body 422 and passes through a hose opening 48 in a gasket 44, as discussed above in connection with the prior embodiments of the invention (for example, see FIGS. 1 and 12). A clamp ring clamps the gasket 44 between one of the clamping flanges 428, 438 and a clamp plate. While the clamp rings 60 and clamp plates 50, 150, etc., as discussed in connection with the previous embodiments can be used, in a preferred further development shown in FIGS. 29-34, the clamp plate 450 is used and is provided as two clamp plate pieces 451A, 451B that are aligned together about a dividing line 453 to form the clamp plate 450. A gasket groove 452 is preferably also provided. As shown in FIGS. 29 and 32, and a clamp plate hose opening 454 for the hose or tube intersects the dividing line 453. As discussed above, the tube or hose and the gasket are single use, but the clamp plates 450 can be re-used.

As shown in FIGS. 29 and 34, in one particularly preferred arrangement, the clamp ring 460 includes two half-rings 462A, 462B that are connected to one another by a hinge 464 at one end, and can be pivoted together and clamped in a closed position by a clamp screw 466. However, in order to allow easier handling and installation, the clamp plate pieces 451A, 451B are fixed to respective ones of the half-rings 462A, 462B. This is preferably done with a welded connection 468, as shown in FIG. 30. This arrangement allows the clamp ring 460 and clamp plate 450 to be installed over a hose or tube that is positioned in or through the tube assembly 420 or any of the prior tube assemblies by a single installer.

Referring now to FIGS. 35-37, a clamp plate 450' having two clamp plate pieces 451A', 451B' is shown that includes a plurality of the clamp plate hose openings 454'. Each of the clamp plate hose openings 454' intersects the dividing line. This allows the two clamp plate pieces 451A', 451B' to be installed over multiple hoses. The clamp plate pieces 451A', 451B' can be fixed to respective ones of the half-rings 462A, 462B of a clamp ring 460 in a similar manner as discussed above.

In one arrangement, the clamp plate hose opening 454 is larger than an outside diameter of the hose or tube to be inserted therethrough. Alternatively, as shown in FIGS. 38 and 39, the clamp plate 450", 450'", preferably formed of two clamp plate pieces 451A", 451B"; 451A'", 451B'" can include a clamp plate hose opening 454", 454'" having a tube engaging profile on an inner surface thereof. Here, the hose or tube preferably fits in the clamp plate hose opening 450", 450'" with an interference fit. The tube engaging profile can be a convex surface, as shown in FIG. 38. It can also be a beveled surface, as shown in FIG. 39, or other shape that provides a more concentrated contact force for engaging the hose or tube that extends through the opening 454", 454'".

Referring to FIGS. 40-42, another embodiment of the clamp plate 450"" is shown in connection with the clamp ring 460 in order to clamp a gasket 444 to a clamping flange 428, such as discussed above. Here, the clamp plate 450"" is preferably formed in two clamp plate pieces 451A"", 451B"", which together provide an over-size opening 454"", which is preferably at least 60% of a clear cross-section of the tubular body 422, and can be used with multiple different gasket configurations in which the tube(s) or hose(s) 40 is (are) press fit or bonded to opening(s) 448 in the gasket 444. For ease of installation, one or both clamp pieces 451A"", 451B"" can be welded or bonded to respective halves 462A, 462B of the clamp 460.

Referring to FIGS. 43 and 44, another embodiment of a one-piece isolating gasket and end cap 544 for use in connection with the pass through systems 10, 110, 201, 310, 410 described above is provided which eliminates the need for a separate end cap. Here, the one-piece isolating gasket and end cap 544 is formed, preferably by molding, of an elastomeric material having sufficient structural rigidity to be clamped, for example, to the clamping flange 428 using the clamp 460. Preferably, reinforcing ribs 545 can be provided on the one-piece isolating gasket and end cap 544 as shown; however, these are not necessarily required depending on the material used. The one-piece isolating gasket and end cap 544 can be provided as a solid end cap or with one or more holes 548 for tube(s) or hose(s) to pass through, preferably with an interference fit or bonded connection. It is also possible to mold, such as by insert molding, an elastomeric material over a reinforcing plate or support so that the one-piece isolating gasket and end cap 544 is a unitary structure formed from two materials in order to take advantage of a softer elastomer at the sealing surface of the clamping flange 428. In this case, the outer surface of the one-piece isolating gasket and end cap 544 could include markings where there are openings in the reinforcing plate so that opening(s) 548 could later be cut for the tube or hose 40.

As discussed above, the hose or tube is preferably made of silicone or a thermoplastic material the gasket is made from silicone or a thermoplastic material, and is connected to the hose using silicone or an adhesive of chemical bond In another aspect, a method of connecting a hose through a single-use wall pass-through system 410 is provided. The method is similar to the method discussed above in connection with the system 310, and includes removing a clamp plate 450 installed on a clean side of a wall pass-through chamber defined by tubular body 420 connected to clamping flanges 428, 438 that are attached on either side of a wall 12 through an opening 14 between the clean side and a dirty side, with the tubular body 420 being connected to the wall in a sealed manner;
  installing the tube through a hole or opening in a gasket on the clean side, such that the tube is connected to the clean side gasket in a sealed manner gasket;
  placing an end of the tube which is closed off into an inside of the wall pass-through chamber;
  re-installing the clean side clamp plate 450 over the gasket on the tube on the clean side, preferably by closing together a clamp 460 with the half rings 462A, 462B to which the clamp pieces 451A, 451B are attached, so that the end of the tube is sealed in the chamber;
  pressurizing the chamber with process air from a process air source;
  removing a clamp plate 450 from the dirty side;
  pulling the tube into the dirty side;
  installing the tube through a hole or opening in a gasket on the dirty side such that the tube is connected to the dirty side gasket in a sealed manner gasket;
  re-installing the dirty side clamp plate 450 over the gasket on the tube on the dirty side, preferably by closing together a clamp 460 with the half rings 462A, 462B to which the clamp pieces 451A, 451B are attached, so that the end of the tube extends out through the dirty side gasket.

To retain the tube on one or both sides, the clamp plate 454", 454'" with the clamp plate hose opening 454", 454'" having a tube engaging profile on an inner surface thereof can be used to clamp against the hose or tube.

Referring now to FIG. 45, a kit 610 for converting an existing hygienic flange portal into a pass-through system in accordance with the present invention is shown. The kit 610 includes an adaptor 620 having a clamping flange 628 on one end that is similar to the clamping flanges 28 and 428 described above to which a clamp plate, such as clamp plate 450 and a gasket or end cap, such as 444 or 544 can be connected. The kit 610 further includes a clamp 660 as well as a gasket 626 for connecting a mating flange 624 to the flange 602 of the existing hygienic flange portal 601. While this is illustrated in connection with only one side of the existing hygienic flange portal 601, it could be applied to both sides. The adaptor body 622 is preferably tubular but could have various shapes depending upon the required sizes of the flange 624 to mate with the Flange 602 on the existing portal 601 and the clamping flange 628 used in connection with the present single use wall pass-through system described above.

Referring to FIGS. 46-48, different adaptors 620A, 620B, 620C are shown each having differently sized and shaped bodies 622A, 622B, 622C, which are generally tubular and including the flange 624A, 624B, 624C for connection to the existing portal flange 602 (shown in FIG. 45) and clamping flanges 628A, 628B, 628C for the particularly sized single-use wall pass-through system according to the present invention as described above. This provides the benefit of allowing the present single use system to be adapted to existing installations without the need for installing a new tube assembly through the wall 612.

Referring now to FIGS. 49 and 50, a single-use wall pass-through system 710 in accordance with a further embodiment of the invention is shown. This embodiment of the single-use wall pass-through system 710 is similar to the system 410 described above and includes a tube assembly 720 with a tubular body 722. Preferably, purge tubes 721 and 731 are provided and the tube assembly 720 is functionally equivalent to the tube assembly 420 described above and includes clamping flanges 728, 738 at each end. For installation in a wall 712, the tube assembly 720 is inserted through the opening in the wall 712 and is fixed in position using pipe hangers or braces 724. An elastomeric sleeve 730, 736 is then connected on each side of the tubular body 722 and is sealed to the wall. Preferably, the elastomeric sleeves 730, 736 are each formed as a silicone boot and provide a hermetic seal between the outside of the tubular body 722 and the surface of the wall 712. Once installed, the single-use wall pass-through system 710 can be used in the same manner as described above in connection with the system 410.

Referring to FIG. 50, the clamp 460 is shown in connection with a split clamp plate 750 that can be attached to either clamping flange 728 or 738. FIGS. 51 and 52 are detailed views of the split clamp plate 750 illustrating the two clamp plate pieces 751a, 751b, which are similar to the split clamp plate 450 described above. FIG. 53 shows a gasket 744 made of elastomeric material having two openings 748 therein. The openings are used to connect two hoses, such as hoses 40 as described above, to the gasket 744 in a sealed manner. The gasket 744 is shown together with the split clamp plate 750 in FIG. 54 as would be seen as installed on the clamping flange 728 on one end of the tube assembly 720.

Those skilled in the art will recognize from the present disclosure that the tube assembly 720 could be used in connection with any of the single-use pass-through systems described above as well as in the method for connecting a hose through a single-use wall pass-through system.

The pass-through system 10, 110, 210, 310, 410, 710 provides a sealed pass-through which can be used in connection with chemical, bio and pharma processing applications where material flow in to or out from a clean room or processing environment through single-use silicone or thermoplastic tubes 40. The system 10, 110, 210, 310, 410, 710 ensures that any material that is exposed is contained within the room or area delimited via the wall 12 and/or prevents contaminants from entering into the area. When not in use, end caps (not shown) can be applied to the clamping flanges 28, 38; 128, 138; 228, 238; 328, 338; 428, 438 on the first and second fixed wall parts 20, 30; 120, 130; 220, 230; 320, 330 or the tube assemblies 420, 720 using clamps 60, 460. Additionally, the invention provides for use of the arrangement 10, 110, 210, 310, 410, 710 as a sealable pass-through box for allowing any materials to be passed into or out of the clean room through the pass-through assemblies. As a further option, the invention provides an adaptor kit 610 that allows conversion of existing hygienic flange portals to be used in connection with the arrangements of the present invention.

While the present invention has been described in terms of the preferred embodiment shown, those skilled in the art will recognize that other variations and modifications can be made which fall within the scope of the present invention.

What is claimed is:

1. A single use wall pass-through system, comprising
a tube assembly that is attachable through an opening in a wall, including a tubular body,
a clamping flange connected to each end of the tubular body,
a hose or tube is arranged through the tubular body and passes through a hose opening in an integral one-piece isolating gasket and end cap formed of an elastomer that extends in one piece from the hose or tube to the clamping flange at one end of the tubular body,
a clamp ring that clamps the one-piece isolating gasket and end cap to one of the clamping flanges forming a seal between the clamping flange and the one-piece isolating gasket,
the tube or hose and the one-piece isolating gasket and end cap are single use, and
the one-piece isolating gasket and end cap includes reinforcing ribs.

2. The system of claim 1, wherein there are first and second ones of the support flanges on the tubular body, and a second mounting flange connects the second support flange to an opposite side of the wall from the first mounting flange.

3. The system of claim 1, wherein the hose or tube engages with an interference fit in the hose opening.

4. The system of claim 1, wherein the hose or tube is bonded in the hose opening.

5. A single use wall pass-through system, comprising
a tube assembly that is attachable through an opening in a wall, including a tubular body,
a clamping flange connected to each end of the tubular body,
a hose or tube is arranged through the tubular body and passes through a hose opening in a one-piece isolating gasket and end cap,
a clamp ring that clamps the one-piece isolating gasket and end cap to one of the clamping flanges,
the tube or hose and the one-piece isolating gasket and end cap are single use,
the tubular body comprises at least one support flange, and a first mounting flange is connected to the support flange around an inner periphery of the first mounting flange and adapted to be connected to the wall around an outer periphery thereof that overlaps the opening.

6. A single use wall pass-through system, comprising
a tube assembly that is attachable through an opening in a wall, including a tubular body,
a clamping flange connected to each end of the tubular body,
a hose or tube is arranged through the tubular body and passes through a hose opening in a one-piece isolating gasket and end cap,
a clamp ring that clamps the one-piece isolating gasket and end cap to one of the clamping flanges,
the tube or hose and the one-piece isolating gasket and end cap are single use, and
an elastomer sleeve connected between the tube assembly and the wall.

7. A single use wall pass-through system, comprising
a tube assembly that is attachable through an opening in a wall, including a tubular body,
the tube assembly includes a clamping flange connected to each end of the tubular body,
a hose or tube is arranged through the tubular body and passes through a hose opening in a gasket,
a clamp ring that clamps the gasket between one of the clamping flanges and a clamp plate,
the clamp plate is provided as two clamp plate pieces that are aligned together about a dividing line to form the clamp plate, and a clamp plate hose opening for the hose or tube intersects the dividing line and is at least 60% of a clear cross-section diameter of the tubular body, and
the tube or hose and the gasket are single use.

8. The system of claim 7, wherein the clamp ring includes two half-rings that are connectable to one another, and the clamp plate pieces are fixed to respective ones of the half-rings.

9. The system of claim 8, wherein the clamp plate pieces are fixed to respective ones of the half-rings by a weld.

10. A conversion kit for a single use wall pass-through system, comprising:
an adaptor having a tubular body;
an attachment flange that is configured to mate with a flange of an existing wall pass-through portal located on a first end of the tubular body;
a clamping flange adapted for use with a single use wall pass-through system located on a second end of the tubular body;
a gasket for sealing the attachment flange;
a clamp that is configured to engage the attachment flange and the flange of the existing wall pass-through portal;
a hose or tube is arranged through the tubular body and passes through a hose opening in an integral one-piece isolating gasket and end cap formed of an elastomer that extends in one piece from the hose or tube to the clamping flange of the tubular body, a clamp ring that clamps the one-piece isolating gasket and end cap to the clamping flange forming a seal between the clamping flange and the one-piece isolating gasket, and the tube or hose and the one-piece isolating gasket and end cap are single use.

\* \* \* \* \*